United States Patent [19]

Ishida et al.

[11] Patent Number: 5,320,050

[45] Date of Patent: Jun. 14, 1994

[54] ASH MELTING FURNACE

[75] Inventors: Michio Ishida, Nara; Yoshitoshi Sekiguchi, Maizuru; Kunio Sasaki, Maizuru; Hideo Shimotani, Maizuru, all of Japan

[73] Assignee: Hitachi Zosen Corporation, Osaka, Japan

[21] Appl. No.: 78,721

[22] Filed: Jun. 16, 1993

[30] Foreign Application Priority Data

| Jun. 24, 1992 | [JP] | Japan | 4-165139 |
|---|---|---|---|
| Jun. 25, 1992 | [JP] | Japan | 4-166504 |
| Jun. 25, 1992 | [JP] | Japan | 4-166505 |
| Jun. 26, 1992 | [JP] | Japan | 4-168074 |
| Sep. 21, 1992 | [JP] | Japan | 4-250320 |
| Oct. 5, 1992 | [JP] | Japan | 4-265214 |

[51] Int. Cl.$^5$ ............................................. F23J 1/00
[52] U.S. Cl. .............................. 110/165 R; 110/171; 110/259; 432/161
[58] Field of Search ................... 110/165 R, 171, 259; 432/161

[56] References Cited

U.S. PATENT DOCUMENTS

| 3,741,136 | 6/1973 | Stookey | 110/165 R |
| 4,166,421 | 9/1979 | Stribling | 110/171 X |
| 5,042,399 | 8/1991 | Motomura et al. | 110/165 R |
| 5,081,940 | 1/1992 | Motomura et al. | 110/165 R X |
| 5,188,043 | 2/1993 | Trepaud | 110/171 X |

Primary Examiner—Edward G. Favors
Attorney, Agent, or Firm—Joseph W. Farley

[57] ABSTRACT

An ash melting furnace for heating and melting ashes by a burner. The furnace body is formed with a preheating chamber and a melting chamber. Of the bottom wall of the melting chamber (12), the portion closer to the charging port is convex in transverse cross section, while the portion closer to the discharging port is concave in transverse cross section.

8 Claims, 10 Drawing Sheets

ASH MELTING FURNACE

FIELD OF THE INVENTION

The present invention relates to improvements in an ash melting furnace wherein incineration ashes discharged from a municipal or industrial waste incinerator are melted by using a burner, then cooled and solidified, so as to reduce the volume of incineration ashes and make them harmless.

BACKGROUND OF THE INVENTION

The bottom wall of the furnace body in this known type of ash melting furnace is inclined downwardly from the incineration ash charging side to the molten slag discharging side. And the melting chamber having a heating burner installed therein is positioned on the discharging side of the furnace body, while a preheating chamber is disposed on the charging side of the furnace body for drying and heating the incineration ashes charged into the furnace body, by the combustion exhaust gases produced in the melting chamber. Further, installed on the charging side of the furnace body are an ash charging hopper and an ash push-out device.

The bottom wall of the furnace body is straight, i.e., planar in transverse cross section.

Therefore, in the preheating chamber, the incineration ashes charged into the furnace body from the ash charging hopper by the push-out device are dried and heated by the combustion exhaust gases flowing from the melting chamber while the incineration ashes are moving to the discharging side on the inclined bottom wall of the furnace body. The thus preheated incineration ashes move into the melting chamber, where they are heated and melted by the burner installed in the melting chamber whereupon the molten ashes flow down on the bottom wall until they fall down into the cooling tank through a molten slag discharging port formed in the discharging side In the cooling tank, they are cooled and solidified.

However, since the transverse sectional shape of the bottom wall of the furnace body is straight, i.e., planar throughout the width and since transverse uniform heating by the burner is difficult, the ashes in the central region are melted quickly but the ashes on the opposite sides thereof are melted slowly.

Therefore, on the bottom wall, the rate at which the molten slag flows down varies in different regions and the slate of the discharged molten slag is not uniform. Further, since the upper surface of the bottom wall is inclined straight toward the discharging side, the residence time of ashes is short. Therefore, there is a problem that ashes tend to be discharged before they are melted and another problem is that the molten slag spreads on the entire surface of the bottom wall tending to lower the temperature of the molten slag, causing the latter to solidify more easily to block the discharging port.

SUMMARY OF THE INVENTION

The present invention, which has solved the above problems, provides an ash melting furnace for heating and melting ashes by a burner, comprising a furnace body having an ash charging port formed at one end and a molten ash discharging port formed at the other end, a bottom wall for said furnace body inclined from one end to the other, an ash preheating chamber formed above said bottom wall at one end, and a melting chamber disposed above said bottom wall at the other end and having a heating burner installed therein, wherein the portion of said bottom wall closer to the charging port of the melting chamber is convex in transverse cross section, while the portion thereof closer to the discharging port is concave in transverse cross section.

With this arrangement, since the upstream portion of the bottom wall in the melting chamber is convex in transverse cross section while the downstream portion thereof is concave in transverse cross section, the molten ashes move also in the direction of the width of said furnace body. Therefore, the molten ashes are maintained in the uniform state, and the residence time of the ashes is prolonged, preventing the ashes to be melted from moving unmelted to the discharging port.

Further, in the downstream portion of the bottom wall portion since the molten ashes gather in the central region and flow to the discharging port, the temperature drop occurs less frequently and since the molten ashes, while retaining a high inertial force move to the discharging port, the occurrence of the blocked state of the discharging port can be avoided.

DESCRIPTION OF THE PREFERRED EMBODIMENTS

FIGS. 1 through 4 show a first embodiment of the invention.

Figure 1:
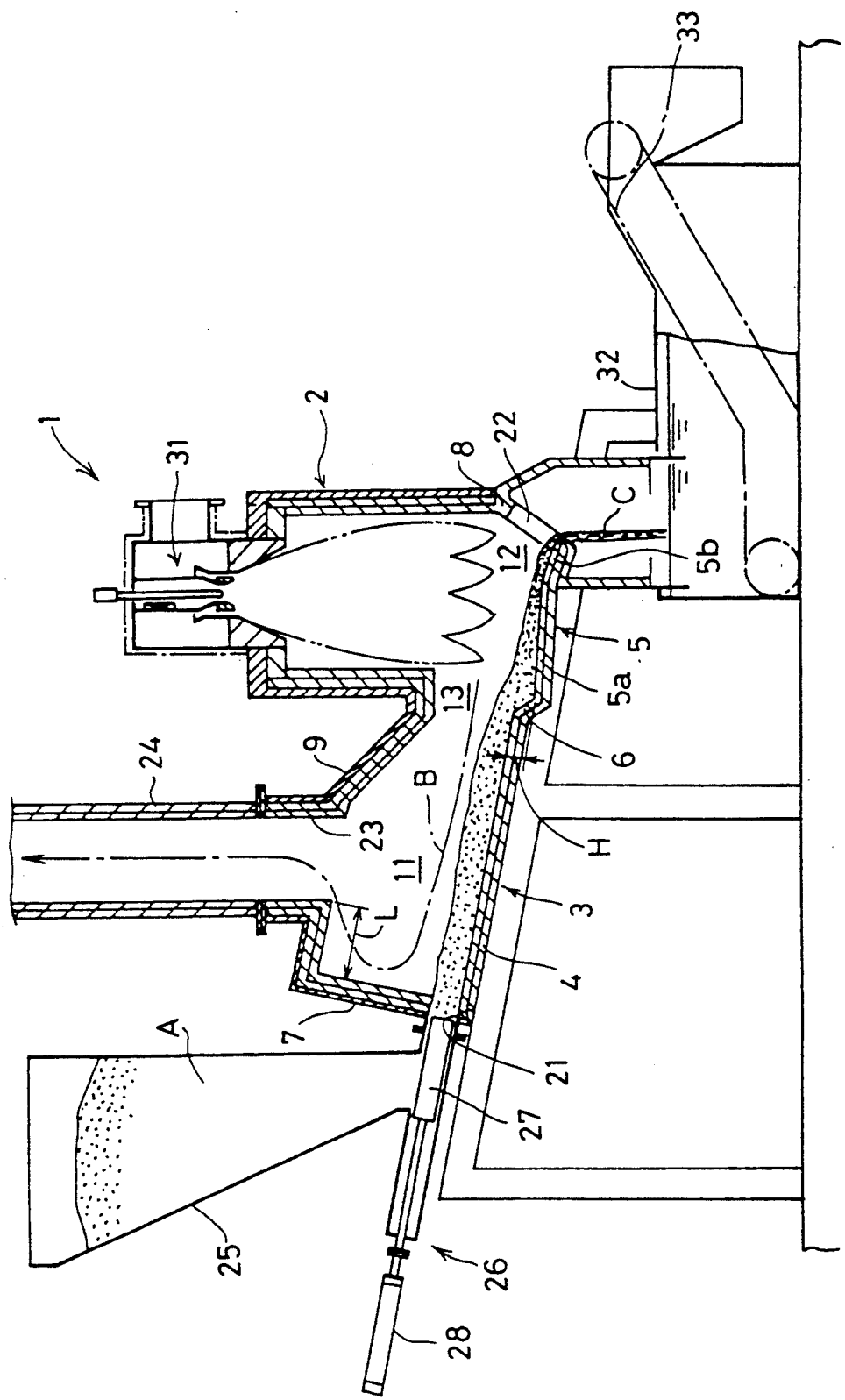
FIG. 1 is a complete sectional view showing the schematic arrangement of an ash melting furnace according to a first embodiment of the present invention.

In FIG. 1, the numeral 1 denotes an ash melting furnace for melting ashes by a burner, and the bottom wall 3 of the furnace body 2 thereof is inclined downwardly from the ash charging side (one end side) to the discharging side (the other end side).

The end wall 7 on the charging side of the furnace body 2 is formed with an ash charging port 21, while the end wall 8 on the discharging side is formed with a discharging port (also called a slag port defined for example by a water cooled pipe) 22 for molten ashes (hereinafter referred to as molten slag).

The portion of the furnace body 2 adjacent the charging port 21 defines an ash preheating chamber 11, and the portion thereof adjacent the discharging port 22 defines a melting chamber 12 for heating and melting ashes.

Further, a communication space 13 between the preheating chamber 11 and the melting chamber 12 in the furnace body 2 is constricted. The upper wall 9 of the preheating chamber 11 adjacent the communication space 13 upwardly diverges, that is, it is upwardly inclined, taking the precautions to minimize the pressure loss produced in this constricted portion.

The bottom wall 3 is formed with a level difference region 6 in the boundary between the preheating chamber 11 and the melting chamber 12 of said furnace body 2 so that the melting chamber 12 is at a lower level. The height H of this level difference region 6 is determined on the basis of the ash layer thickness in the preheating chamber 11. That is the height is determined so that it is substantially one to two times as large as the ash layer thickness (usually, between 100 mm and 200 mm), and this level difference region 6 is higher than the bonded ash layer on the bottom wall of the melting chamber 12, i.e., on the bottom wall 5 on the melting side.

The point of intersection between the line of action of force of an ash push-out device and the upper surface of the bottom wall 5 on the melting side is designed to be positioned sufficiently inwardly of the discharging port 22. That is, the angle of inclination of the bottom wall 5 on the melting side is smaller than that of the bottom wall 4 on the preheating side which is the bottom wall of the preheating chamber 11. In addition, the angle of inclination of the bottom wall 4 on the preheating side is smaller than the friction angle of ashes on the bottom wall 4; for example, it is about 10-30 degrees.

The bottom wall 5 on the melting side is divided into an upstream sections and a downstream section, and the angle of inclination of the upstream bottom wall 5a in the longitudinal direction is in the range of 0-5 degrees; for example, it is about 2 degrees. The angle of inclination of the downstream bottom wall 5b in the longitudinal direction is in the range of 10-20 degrees; for example it is about 15 degrees.

Figure 2:
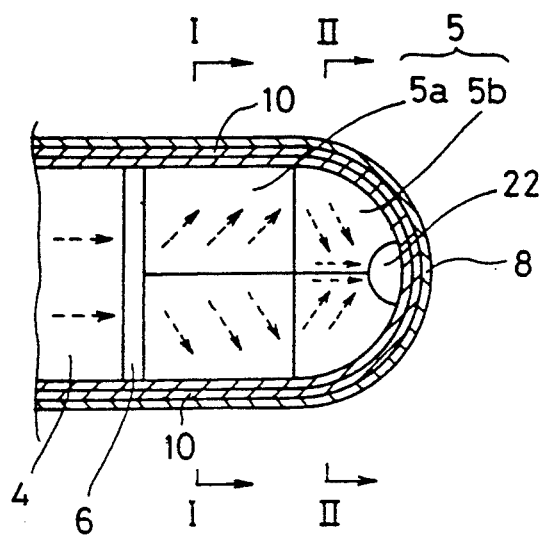
FIG. 2 is a principal plan view of said ash melting furnace.
Figure 3:
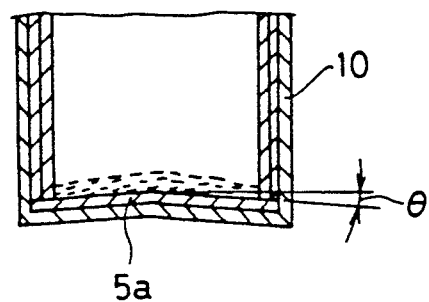
FIG. 3 is a sectional view taken along the line I—I in FIG. 2.
Figure 4:
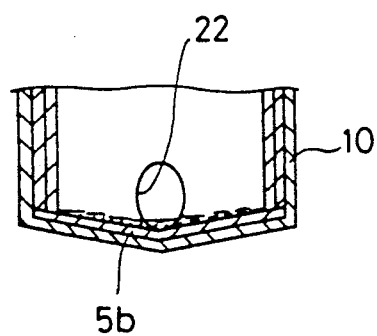
FIG. 4 is a sectional view taken along the line II—II in FIG. 2.
Figure 5:
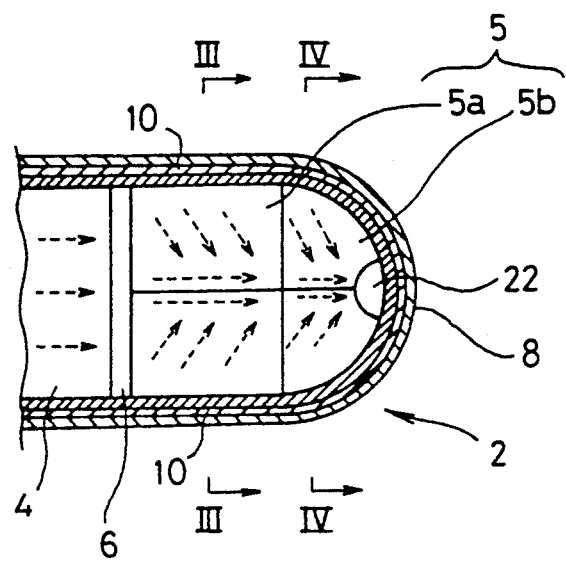
FIG. 5 is a principal horizontal sectional view of an ash melting furnace according to a second embodiment of the invention.

And as shown in FIGS. 2 through 4, the upstream bottom wall 5a is convex in transverse cross section, while the downstream bottom wall 5b is concave in transverse section.

In addition, the angle of inclination $\theta$ of the upstream bottom wall 5a in transverse cross section is for example in the range of 2-5 degrees.

A heating burner 31 for heating ashes is attached to the upper wall 9 of the melting chamber 12, and at a position on the upper wall 9 of the preheating chamber 11 spaced by a predetermined distance (L) from the end wall 7 formed with the charging port 21, there is formed a combustion exhaust gas take-out port 23, with an exhaust gas take-out pipe 24 installed on said take-out port 23.

An ash charging hopper 25 for charging ashes is connected to the charging port 21 of said furnace body 2, with a push-out device 26 attached to the bottom of said ash charging hopper 25 for pushing out the ashes in the ash charging hopper 25 into the furnace body 2.

This push-out device 26 comprises a push-out member 27 adapted to be advanced from the charging port 21 into the furnace body 2, and a cylinder device 28 for advancing and retracting said push-out member 27.

Under the discharging port 22 of the furnace body 2, there is installed a cooling tank 32 for cooling the molten slag discharged through the discharging port 22, and a rake-out conveyer 33 is installed in said cooling tank 32 for raking out the granulated slag which forms after cooling and solidification of the molten slag.

In addition, the undulations of the surface of the bottom wall on the melting side are roughly formed by water-cooled pipes or water-cooled jacket and finally they are adjusted by a lining layer made of a material having high heat conductivity, for example, silicon carbide.

In the above arrangement, the incineration ashes A charged into the furnace body 2 from the ash charging hopper 25 by the push-out device 26 are preheated (dried and heated) by combustion exhaust gases B flowing from the melting chamber 12 through the communication space 13 and move from the preheating chamber 11 into the melting chamber 12, where they are heated by the burner 31 to high temperature for melting.

The molten ashes. i.e.. the molten slag C is discharged from the discharging port 22 into the cooling tank 32, where it is cooled and solidified, said slag being taken out by the rake-out conveyer 33.

In this connection, the ashes moved from the preheating chamber 11 to the melting chamber 12 are melted by the heating burner 31, as described above. On the front bottom wall 5a, this molten slag moves to the opposite lateral walls 10, as indicated by arrows in FIG. 2, and then moves to the downstream bottom wall 5b, where it moves to the middle, then moving to the discharging port 22.

Since the molten slag C, on the bottom wall 5 on the melting side, moves also widthwise of the furnace body 2 in this manner, the ashes in the molten state in the middle region are mixed with the ashes in the unmelted state in the opposite lateral regions, forming a uniform mixture. Further, since the residence time of the ashes in the melting chamber is prolonged, the ashes are prevented from moving unmelted into the discharging port 22.

Further, in the downstream bottom wall 5b the molten slag gathers in the middle region and then flows into the discharging port 22, so that with less temperature drop and greater inertial force, the molten slag travels to the discharging port 22; thus, the blocking of the discharging port 22 is avoided.

Further the ashes in the preheating chamber 11 are moved to the melting chamber 12 by the push-out device 26. In this case, the level of the bottom wall 5 on the melting side is lower than that of the bottom wall 4 on the preheating side with difference in level corresponding at least to the thickness of the ash layer. Therefore, even if a bonded layer forms in the melting chamber 12, the ashes being pushed out of the preheating chamber 11 will push such bonded layer.

Therefore, the behavior (feed rate) of ashes in the melting chamber 12, the furnace temperature, and the viscosity of molten slag can be controlled from the outside.

Further, the level difference region 6 causes a dislocation-like change in the ash layer, increasing the heat receiving area of ashes, so that more effective melting of ashes can be achieved.

Further since the movement of ashes across the level difference region 6 is very smooth, there is almost no possibility of ashes flying up in the air; thus, the amount of fly ash concomitant with the combustion exhaust gases is minimized.

Therefore, such phenomena as the unmelted ashes moving over the bonded layer and the ashes in the melting chamber being uncontrolled can be avoided.

Since the communication space 13 between the preheating chamber 11 and the melting chamber 12 is constricted, the radiant heat from the heating burner 31 is prevented from being directed to the preheating chamber 11.

Since the take-out port 23 for combustion exhaust gases is spaced from the end wall 7 of the furnace body 2 by the predetermined distance (L), the combustion exhaust gases flowing into the preheating chamber 11 once hit the end wall 7 having the charging port 21 and thus move in a detouring path and then they are taken out of the combustion exhaust gas take-out pipe 24. Therefore, the ashes contained in the combustion exhaust gases fall down during this detouring travel. Therefore, the amount of fly ash concomitant with the combustion exhaust gases is minimized.

The constricted construction of the communication space prevents the radiant heat from the heating burner from being radiated to the preheating chamber, so that the ashes are efficiently heated in the melting chamber.

FIGS. 5 through 8 show a second embodiment of the invention.

This embodiment is designed so that the sectional shape of the bottom wall of the furnace body differs from that used in the first embodiment. Figures to show the entire arrangement are omitted and the same parts as used in the first embodiment are denoted by the same reference numerals to avoid a repetitive description thereof.

The bottom wall 5 on the melting side closer to the discharging port 22 in the bottom wall 3 of the furnace body 2 is divided into two parts in the direction of movement of ashes. And the angle of inclination of the upstream bottom wall 5a in the longitudinal direction is in the range of 0-5 degrees; for example, it is about 2 degrees, while the angle of inclination of the downstream bottom wall 5b in the longitudinal direction is in the range of 10-30 degrees; for example, it is about 15 degrees.

Figure 6:
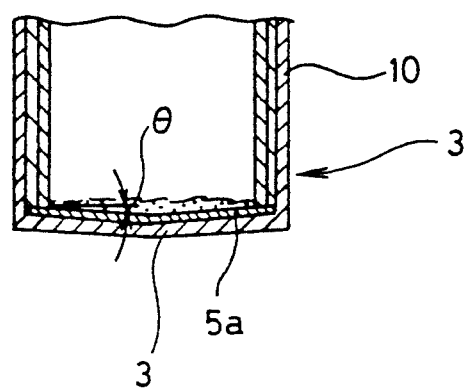
FIG. 6 is a sectional view taken along the line III—III in FIG. 5.
Figure 7:
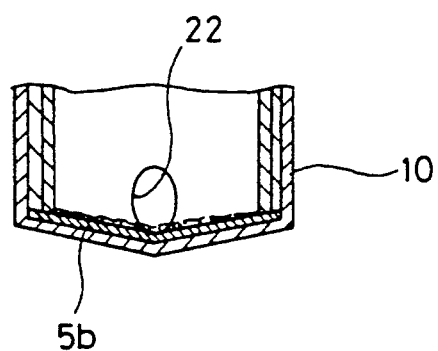
FIG. 7 is a sectional view taken along the line IV—IV in FIG. 5.

As shown in FIGS. 6 and 7 the upstream and downstream bottom walls 5a and 5b are concave in transverse cross section.

The angle of inclination θ of the upstream and downstream bottom walls 5a and 5b in the direction of the width is in the range for example of 2-5 degrees.

Figure 8:
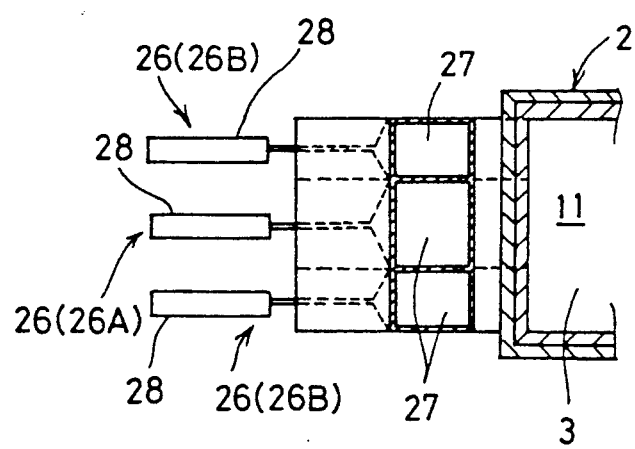
FIG. 8 is a principal horizontal sectional view of said embodiment.

In this embodiment, as shown in FIG. 8, a plurality of (at least three) push-out devices 26 are arranged widthwise of the furnace body 2, each of these push-out device 26 extending parallel with feed direction of the ashes.

Of course, each of these push-out devices 26 consists of a push-out member 27 adapted to be advanced from the charging port side into the furnace body 2, and a cylinder 28 for advancing and retracting said push-out member 27.

In the above arrangement, the incineration ashes charged into the furnace body 2 from the ash charging hopper by the push-out devices 26 are preheated (dried and healed) by combustion exhaust gases flowing from the melting chamber through the communication space and move from the preheating chamber into the melting chamber 12, where they are heated by the burner to high temperature for melting.

The molten ashes. i.e., the molten slag is discharged from the discharging port 22 into the cooling tank, where it is cooled and solidified, said slag being taken out by the rake-out conveyer.

In this connection, the ashes moved from the preheating chamber to the melting chamber are melted by the heating burner. On the upstream and downstream bottom wall 5a and 5b. this molten slag moves from the opposite lateral walls 10 to the middle region as indicated by arrows in FIG. 5, and then moves to the discharging port 22.

And at this time, the push-out device 26A disposed in the middle operates faster than the push-out devices 26B disposed at the opposite lateral sides whereby the molten slag melted in the middle region is moved faster to the discharging port 22 while the molten slag in the opposite sides is led to the middle region thereby achieving the uniformization of molten slag.

Since the molten slag, on the bottom wall 5 on the melting side, moves also widthwise of the furnace body 2 in this manner, the same merits as in the first embodiment can be attained.

Thus, according to the arrangement of the second embodiment, the bottom wall of the melting chamber is concave in transverse cross section and the molten slag in the middle region moves faster while the molten slag also moves in the direction of the width, so that the molten slag is in the uniform state. Further, since the residence time of the ashes in the melting chamber is prolonged, the ashes are prevented from moving unmelted into the discharging port 22. Further, the molten slag gathers in the middle region and then flows into the discharging port 22, so that with less temperature drop and greater inertial force, the molten slag travels to the discharging port 22; thus, the blocking of the discharging port 22 is avoided.

FIGS. 9 through 13 show a third embodiment of the invention.

The ash melting furnace according to this embodiment is substantially the same in its overall arrangement as those described above, the differences being in the bottom wall of the furnace body; thus, a description will be given with attention directed to this part while briefing the rest of the arrangement.

Figure 9:
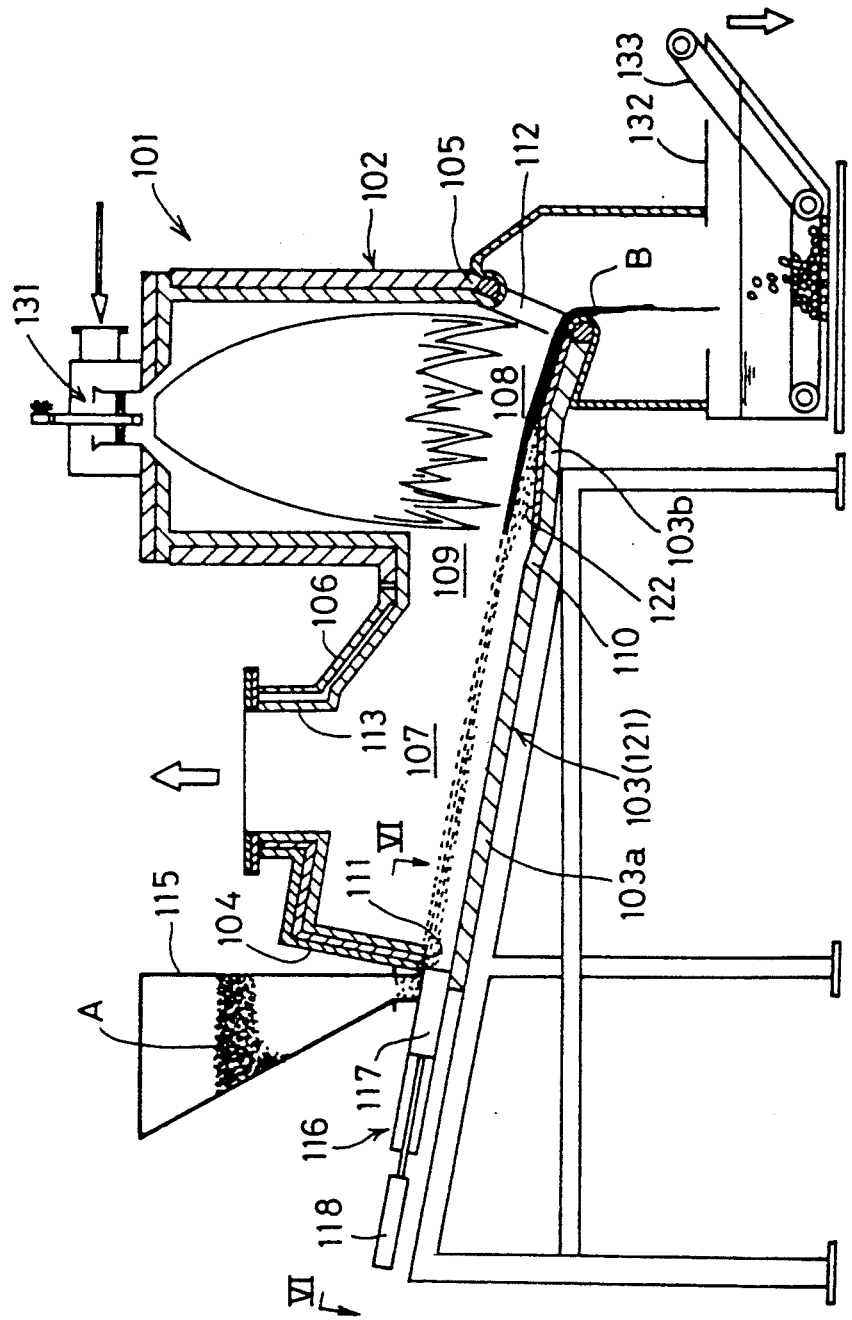
FIG. 9 is a complete sectional view showing the schematic arrangement of an ash melting furnace according to a third embodiment of the present invention.

In FIG. 9, the numeral 101 denotes an ash melting furnace for melting ashes by a burner, and the bottom wall 103 of the furnace body 102 thereof is inclined downwardly from the ash charging side to the discharging side.

The end wall 104 on one end side of the furnace body 102 is formed with an ash charging port 111, while the end Wall 105 on the other end side is formed with a discharging port 112 for molten slag C (slag port).

Figure 10:
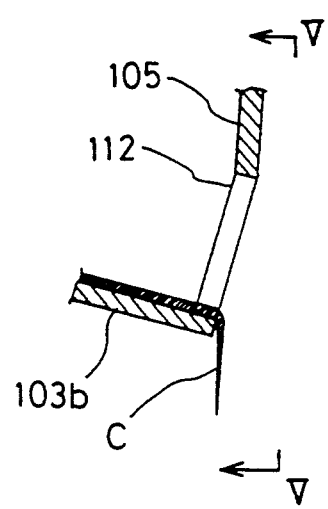
FIG. 10 is a principal sectional view of said embodiment.
Figure 11:
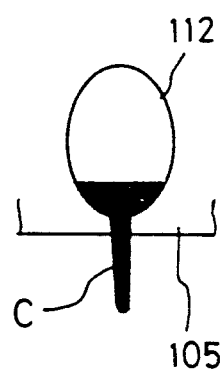
FIG. 11 is a view taken as indicated by the arrows V—V in FIG. 10.
Figure 12:
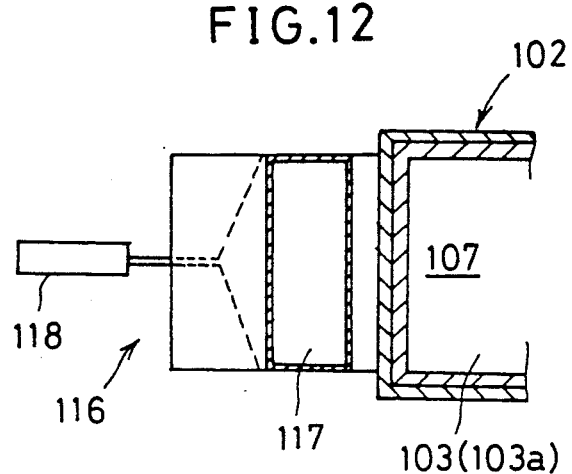
FIG. 12 is a sectional view taken along the line VI—VI in FIG. 9.

And as shown in FIGS. 10 and 11, the lower portion of the end wall 105 formed with this discharging port 112 is somewhat outwardly inclined, and said discharging port 112 is elliptic.

The portion of the furnace body 102 adjacent the charging port 111 defines an ash preheating chamber 107, and the portion thereof adjacent the discharging port 112 defines a melting chamber 108 for heating and melting ashes. Further, a communication space 109 between the preheating chamber 107 and the melting chamber 108 in the furnace body 102 is constricted.

The bottom wall 103 is formed with a level difference region 110 in the boundary between the preheating chamber 107 and the melting chamber 108 of said furnace body 102 so that the melting chamber 108 is at a somewhat lower level.

This bottom wall 103 may be formed of water cooled pipes 121 (or a water cooled jacket, an example of a cooling member) laid throughout, and the upper surfaces of the water cooled pipes 121 of the bottom wall 103b on the melting side which is the bottom wall of the melting chamber 108 is covered with a lining 122.

In addition, the angle of inclination of the bottom wall 103a on the preheating side which is the bottom wall of the preheating chamber 107 is smaller than the friction angle of ashes on the bottom wall 103a (for example, it is about 10–30 degrees). Further, of the bottom wall 103b on the melting side, the angle of inclination of the portion closer to the discharging port is somewhat larger than that of the portion closer to the charging port.

A heating burner 131 for heating ashes is attached to the upper wall 106 for the melting chamber 108. At a position on the upper wall 108 of the preheating chamber 107 spaced by a predetermined distance from the end wall 104 formed with the charging port 111, there is formed a combustion exhaust gas take-out port 113.

An ash charging hopper 115 for charging ashes is connected to the charging port 111 of said furnace body 102, with a push-out device 116 attached to the bottom of said ash charging hopper 115 for pushing out the ashes in the ash charging hopper 115 into the furnace body 102 through the charging port 111.

This push-out device 116 (constructed in the same manner as in the other embodiments) comprises a push-out member 117 disposed on the bottom of the ash charging hopper 115 and adapted to be advanced from the charging port 111 into the furnace body 102, and a cylinder device 118 for advancing and retracting said push-out member 117.

In the lower region associated with the discharging port 112 of the furnace body 102, there is installed a cooling tank 132 for cooling the molten slag C discharged through the discharging port 112, and a rake-out conveyer 133 is installed in said cooling tank 132 for raking out the slag which forms after cooling and solidification of the molten slag.

In the above arrangement when the push-out member 117 of the push-out device 116 is advanced and retracted by the cylinder device 118, the incineration ashes A on the inner bottom of the ash charging hopper 115 are successively fed into the preheating chamber 107 through the charging port 111.

In addition, the rate at which the ashes are pushed out by the push-out device 116 is selected such that the surface melting of ashes does not start before the incineration ashes reach the inlet port of the melting chamber 108.

And the incineration ashes A fed onto the bottom wall 103a on the preheating side are preheated (dried and heated) by the combustion exhaust gases flowing from the melting chamber 108 through the communication space 109.

The incineration ashes A preheated in the preheating chamber 107 move through the communication space 109 into the melting chamber 108, where they are heated by the heating burner 131 to high temperature for melting.

The molten ashes, i.e., the molten slag C is discharged from the discharging port 112 into the cooling tank 132, where it is cooled and solidified, said slag being taken out by the rake-out conveyer 133.

Since the incineration ashes A fed from the ash charging hopper 115 into the furnace body 102 in this manner are successively fed, starting with the portion placed on the bottom of the charging hopper 115, by the push-out member 117 of the push-out device 116 through the charging port 111, there is no possibility of cold or wet incineration ashes entering the preheating chamber unlike the case where the opening in the ash charging hopper is connected directly to the upper region of the preheating chamber of the furnace body. Therefore, the atmosphere in the furnace body is maintained in the stable state, making it possible to prevent troubles from occurring during the discharging of molten slag or prevent unmelted ashes from migrating into the molten slag.

Further, for the flooring of the bottom wall, water-cooled pipes 121 are used, and the surfaces of the water-cooled pipes in the bottom wall 103a on the preheating side are exposed; therefore even if the incineration ashes A sinter on the bottom wall 103a on the preheating side, they will never adhere lo the surface of the bottom wall 103a on the preheating side.

Figure 13:
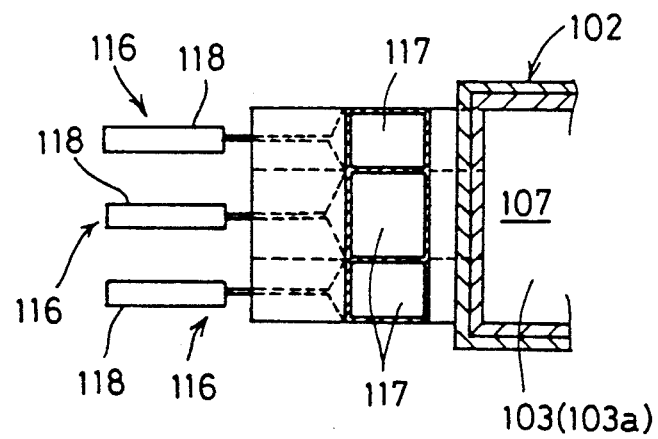
FIG. 13 is a view corresponding to the VI—VI section, showing a modification of the third embodiment.

In this embodiment, a single push-out device 116 has been installed over the entire width of the furnace body 102; however, as shown in FIG. 13, three push-out devices 116 may be disposed widthwise of the furnace body 102 for controlling the feeding of ashes individually according to the melting state in the furnace body 102.

Further, in the above embodiment, the lower portion of the end wall 105 formed with the discharging port 112 has been somewhat downwardly inclined, but it may be vertical as is the case with the upper portion thereof. Further, the discharging port 112 may be circular or rhombic.

According to the arrangement of this third embodiment, ashes fed from the ash charging hopper into the furnace body are successively fed starting with the portion placed on the bottom of the charging hopper, by the push-out device through the charging port, there is no possibility of cold or wet incineration ashes entering the preheating chamber unlike the case where the opening in the ash charging hopper is connected directly to the upper region of the preheating chamber of the furnace body. Therefore, the atmosphere in the furnace body is maintained in the stable state, making it possible to prevent troubles from occurring during the discharging of molten slag or prevent unmelted ashes from migrating into the molten slag.

Further, for the flooring of the bottom wall 103, water-cooled pipes 121 are used; therefore, even if the incineration ashes A sinter they will never adhere to the surface of the bottom wall. Further, since the discharging port for molten slag is formed in the inclined or vertical end wall and its opening is elliptic, circular or rhombic, the molten slag gathers in the lower portion of the discharging port. Therefore, only a single stream of molten slag flows out into the slag cooling chamber, and the amount of dissipated heat is decreased to minimize the tendency to impede the fluidity, thus preventing the blocking of the discharging port.

Figure 14:
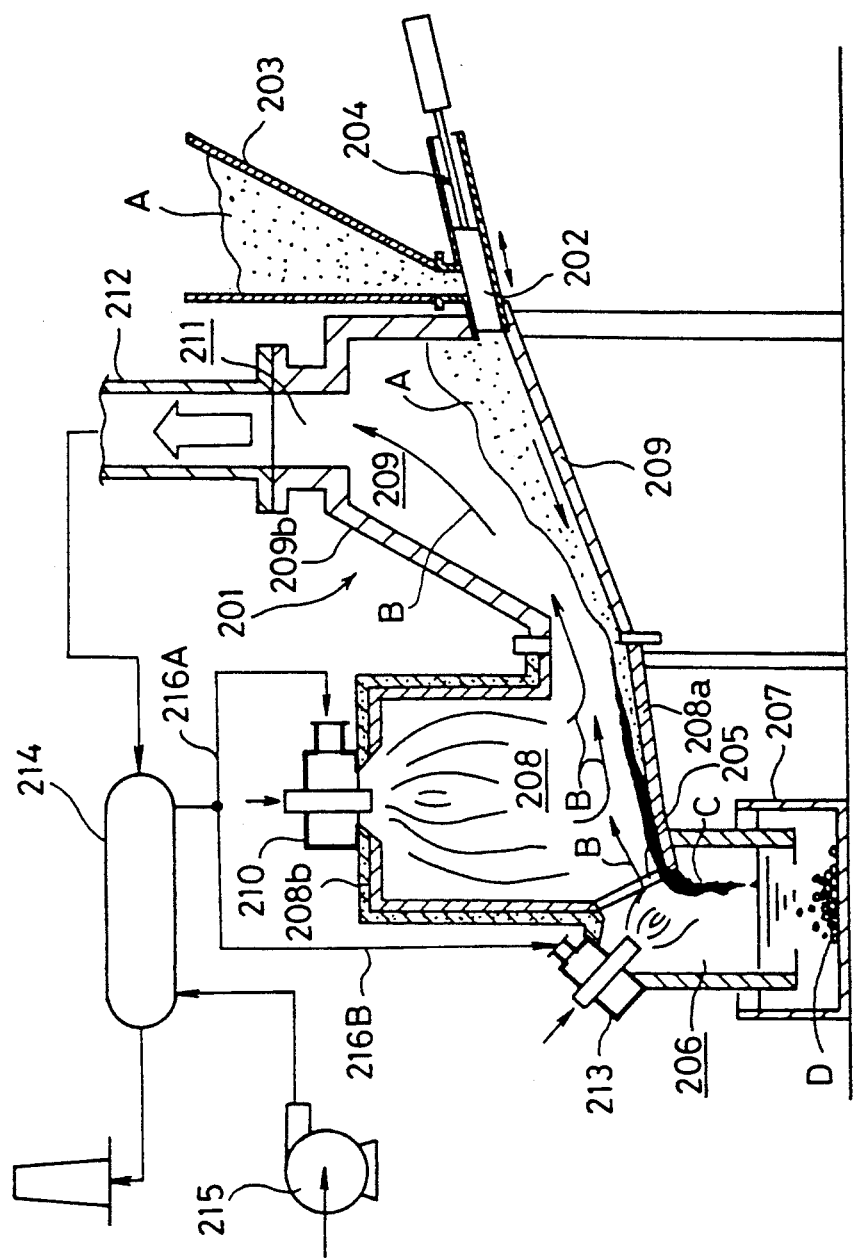
FIG. 14 is a complete sectional view showing the schematic arrangement of an ash melting furnace according to a fourth embodiment of the present invention.

FIG. 14 shows a fourth embodiment of the present invention.

This fourth embodiment relates to the cooling chamber for molten slag and since its basic arrangement is the same as that described in each of the above embodiments, a detailed description of the basic arrangement is omitted.

The numeral 201 denotes the furnace body of an ash melting furnace, having an ash charging hopper 203 installed at one end through an ash charging port 202, with a push-out device 204 installed in said charging port 202 for feeding incineration ashes A from the ash charging hopper by a predetermined amount each time.

The other end (the downstream portion) of the furnace body 201 has a slag cooling chamber 206 formed therein which communicates with the furnace body through a slag discharging port 205, and a cooling tank 207 is disposed below the slag cooling chamber 206 for cooling molten slag C to produce granulated slag.

Further, in said furnace body 201, a melting chamber 208 is disposed at one end and a preheating chamber 209 is disposed at the other end, the bottom walls of said melting chamber 208 and preheating chamber 209 being inclined downwardly from the charging port 202 at one end to the discharging port 205 at the other end. The upper wall 208b of said melting chamber 208 has a heating burner 210 mounted thereon. The upper wall 209a of the preheating chamber 209 has a take-out port 211 formed therein for taking out combustion exhaust gases, said take-out port 211 having an exhaust gas take-out pipe 212 connected thereto.

The upper wall 206 of the slag cooling chamber 206 has an auxiliary burner 213 mounted thereon at a position opposed to the discharging port 205 for molten slag. This auxiliary burner 213 is attached so that its flames are directed to the discharging port 205 and to molten slag C being discharged.

In addition, said exhaust gas take-out pipe 212 has a preheater 214 attached thereto. The combustion air fed from a blower 215 is preheated by this preheater 214, and this preheated combustion air is fed into the heating burner 20 and auxiliary burner 213 through air feed pipes 216A and 216B.

In the above arrangement, the incineration ashes A in the ash feeding hopper 203 are ted from the preheating chamber 209 into the melting chamber 204 by the push-out device 204. At this time, the incineration ashes A are preheated by the combustion exhaust gases B flowing from the two burners 210 and 213 counter to said incineration ashes.

The preheated incineration ashes A are melted by the heating burner 210 to become molten slag C. This molten slag C is dropped from the discharging port 205 into the cooling tank 207 in the slag cooling chamber 206, where it is cooled and solidified to become granulated slag D.

At this time, the molten slag C is heated by the auxiliary burner 213, it is prevented from having its temperature lowered enough for the slag to be bonded lo the discharging port 205. Therefore, there is no possibility of the discharging port 205 being blocked. Further, in the melting chamber 208 and preheating chamber 209 since the combustion exhaust gases B from the heating burner 210 and auxiliary burner 213 flow into the preheating chamber 208, there is no possibility of unmelted ashes flowing into the slag cooling chamber 206 and the unmelted ashes adhering to the surface of the molten slag for concomitance are healed and melted by the auxiliary burner 213. Therefore, unmelted ashes, i.e., unburnt substances are prevented from being contained in the granulated slag; thus, granulated slag of high quality can be obtained.

Thus, according to the arrangement of the fourth embodiment, since the molten slag delivered to the slag cooling chamber from the melting chamber through the discharging port is heated by the auxiliary burner, it is prevented from adhering to the periphery of the discharging port to block the latter.

Further, all combustion exhaust gases from the auxiliary burner and heating burner flow into the exhaust gas take-out pipe through the preheating chamber counter to the flow of the incineration ashes, so that the heat of the combustion exhaust gases can be efficiently utilized. Therefore, the running cost of the ash melting furnace is lowered and the unmelted ashes are prevented from flowing into the slag cooling chamber.

Further, since unmelted ashes adhering to the surface of the molten slag is melted by the auxiliary burner, the proportion of the unburnt substances contained in the granulated slag obtained by cooling the molten slag is minimized. Therefore, the quality of the granulated slag is improved and reuse of slag is enhanced.

Further, all the necessary piping arrangement consists only of piping for the heating burner and auxiliary burner and the gas take-out pipe; thus, the piping arrangement can be simplified.

Further, since the discharging port for molten slag is formed in the lateral wall of the melting chamber, the flames at the highest temperature can heat the discharging port and also the molten slag flowing out therethrough, thus preventing the molten slag discharging port from being blocked.

What is claimed is:

1. An ash melting furnace for heating and melting ashes by a burner, comprising a furnace body having an ash charging port formed at one end and a molten ash discharging port formed at the other end, a bottom wall for said furnace body inclined from one end to the other, an ash preheating chamber formed above said bottom wall at one end, and a melting chamber disposed above said bottom wall at the other end and having a heating burner installed therein, wherein the portion of said bottom wall closer to the charging port of the melting chamber is convex in transverse cross section, while the portion thereof closer to the discharging portion is concave in transverse cross section.

2. An ash melting furnace for heating and melting ashes by a burner, comprising a furnace body having an ash charging port formed al one end and a molten ash discharging port formed at the other end, a bottom wall for said furnace body inclined from one end to the other, an ash preheating chamber formed above said bottom wall at one end, and a melting chamber disposed above said bottom wall at the other end and having a heating burner installed therein, wherein a level difference region is defined on said bottom wall in the boundary between the preheating chamber and the melting chamber such that the bottom wall of said melting chamber is al a lower level than the bottom wall of said ash preheating chamber, with a difference in level amounting to one to two times as large as the thickness of ash layer.

3. An ash melting furnace for heating and melting ashes by a burner comprising a furnace body having an ash charging port formed at one end and a molten ash discharging port formed at the other end, a bottom wall for said furnace body inclined from one end to the other, an ash preheating chamber formed above said bottom wall at one end, a melting chamber formed above said bottom wall at the other end and having a heating burner installed in the upper region thereof, and a combustion exhaust gas take-out port formed in the preheating chamber at a position spaced from the end wall at one end.

4. An ash melting furnace as set forth in claim 3, further comprising a constricted communication space disposed between said preheating chamber and said melting chamber.

5. An ash melting furnace for heating and melting ashes by a burner, comprising a furnace body having an ash charging port formed at one end and a molten ash discharging port formed at the other end, a bottom wall for said furnace body inclined from one end to the other, an ash preheating chamber formed above said bottom wall at one end, a melting chamber formed above said bottom wall at the other end and having a heating burner installed in the upper region thereof, a plurality of push-out devices disposed widthwise of said furnace body, each of these push-out devices extending parallel with a feed direction of the ashes, the bottom wall of said melting chamber being concave in transverse cross section, the central one of said push-out devices being operated faster than the others disposed at the opposite sides.

6. An ash melting furnace for heating and melting ashes by a burner, comprising a furnace body having an ash charging port formed at one end and a molten ash discharging port formed at the other end a bottom wall for said furnace body inclined from one end to the other, an ash preheating chamber formed above said bottom wall at one end, a melting chamber formed above said bottom wall at the other end and having a heating burner installed in the upper region thereof, an ash charging hopper communicating with said charging port, a push-out device adapted to be advanced from said charging port into the furnace body and retracted therefrom so as to push out the ashes in the ash charging hopper from said charging port into the preheating chamber, at least the portion of said bottom wall for the preheating chamber being formed of a cooling member.

7. An ash melting furnace for heating and melting ashes by a burner, comprising a furnace body having an ash charging port formed at one end and a slag cooling chamber at the other end through a molten ash discharging port, an ash feeding hopper connected to said charging port, a preheating chamber formed in said furnace body at one end, a melting chamber formed in said furnace body at the other end and having a heating burner, wherein the discharging port formed in the end wall which is vertical or inclined at a predetermined angle at the other end of the furnace body is circular, elliptic or rhombic.

8. An ash melting furnace for heating and melting ashes by a burner, comprising a furnace body having an ash charging port formed at one end and a slag cooling chamber at the other end through a molten ash discharging port, an ash feeding hopper connected to said charging port, a preheating chamber formed in said furnace body at one end, a melting chamber formed in said furnace body at the other end and having a heating burner, and an auxiliary burner installed in said slag cooling chamber in a position such that said auxiliary burner is adapted to heat said melting ashes.

* * * * *